United States Patent
Rooks et al.

(10) Patent No.: US 8,655,334 B2
(45) Date of Patent: Feb. 18, 2014

(54) SYSTEM AND METHOD FOR CONFIGURING A COMMUNICATION DEVICE

(75) Inventors: Kelsyn D. S. Rooks, Overland Park, KS (US); Jeffrey Sweeney, Olathe, KS (US); Mark Wilmoth, Gardner, KS (US); Kendra Dwyer, Wellsville, KS (US); Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 393 days.

(21) Appl. No.: 12/250,061

(22) Filed: Oct. 13, 2008

(65) Prior Publication Data

US 2010/0093331 A1    Apr. 15, 2010

(51) Int. Cl.
*H04M 3/00*    (2006.01)

(52) U.S. Cl.
USPC ......... 455/418; 455/419; 455/420; 455/414.1

(58) Field of Classification Search
None
See application file for complete search history.

(56) References Cited

U.S. PATENT DOCUMENTS

| | | | |
|---|---|---|---|
| 7,054,623 B1* | 5/2006 | Cushway | 455/419 |
| 7,515,569 B2* | 4/2009 | Prasad | 370/338 |
| 2005/0136842 A1* | 6/2005 | Fan et al. | 455/67.11 |
| 2005/0195667 A1* | 9/2005 | DiSanto et al. | 365/202 |
| 2005/0215233 A1* | 9/2005 | Perera et al. | 455/411 |
| 2007/0099671 A1* | 5/2007 | Gruchala et al. | 455/564 |
| 2007/0298775 A1* | 12/2007 | Patzer et al. | 455/419 |
| 2009/0061872 A1* | 3/2009 | Hicks | 455/436 |
| 2009/0067396 A1* | 3/2009 | Fischer | 370/338 |
| 2009/0210898 A1* | 8/2009 | Childress et al. | 725/34 |
| 2009/0323911 A1* | 12/2009 | Dury | 379/88.22 |

* cited by examiner

*Primary Examiner* — Suhail Khan
(74) *Attorney, Agent, or Firm* — Patton Boggs LLP

(57) ABSTRACT

The disclosed embodiments provide a system and method for configuring a communication device. In one embodiment, a method is presented that includes monitoring for a presence of at least one mobile device that stores a user profile. In response to the communication device detecting the presence of at least one mobile device that stores a user profile, the method retrieves the user profile from the mobile device. The method configures the communication device in accordance with the user profile.

22 Claims, 6 Drawing Sheets

SYSTEM AND METHOD FOR CONFIGURING A COMMUNICATION DEVICE

BACKGROUND OF THE INVENTION

1. Field of the Invention

The principles of the present invention relate to telecommunications, and more specifically, to configuring a communication device.

2. Description of the Related Art

Some communication devices utilize user profiles for configuring settings specific to a user, such as, but not limited to, the identity of a preferred network carrier, a telephone number assigned to the user, speed call/contact information, class of service allowed, and/or other custom calling features. However, a problem arises when a user uses a communication device that is not already configured with the user's profile. In such case, the user is unfamiliar with the settings of the communication device and/or unable to obtain contact information that is associated with the user's profile. A current method for solving this dilemma requires the user to enter a code and/or call a specific number to have the user's profile retrieved from a central database for user in configuring the desired communication device. This method may be cumbersome due to a number of factors, such as, but not limited to, the user's familiarity with the process of retrieving the user's profile, the amount of time required to retrieve the user profile from the central database, the amount of user interaction needed to retrieve the user profile, and/or the user remembering his/her assigned user code. Thus, the disclosed embodiments present a method for configuring a communication device that overcomes the above deficiencies.

SUMMARY

According to one embodiment of the invention, a method for configuring a communication device is presented. The method includes monitoring for a presence of at least one mobile device that stores a user profile. In response to the communication device detecting the presence of at least one mobile device that stores a user profile, the method retrieves the user profile from the mobile device. The method configures the communication device in accordance with the user profile.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE INVENTION

Figure 1:
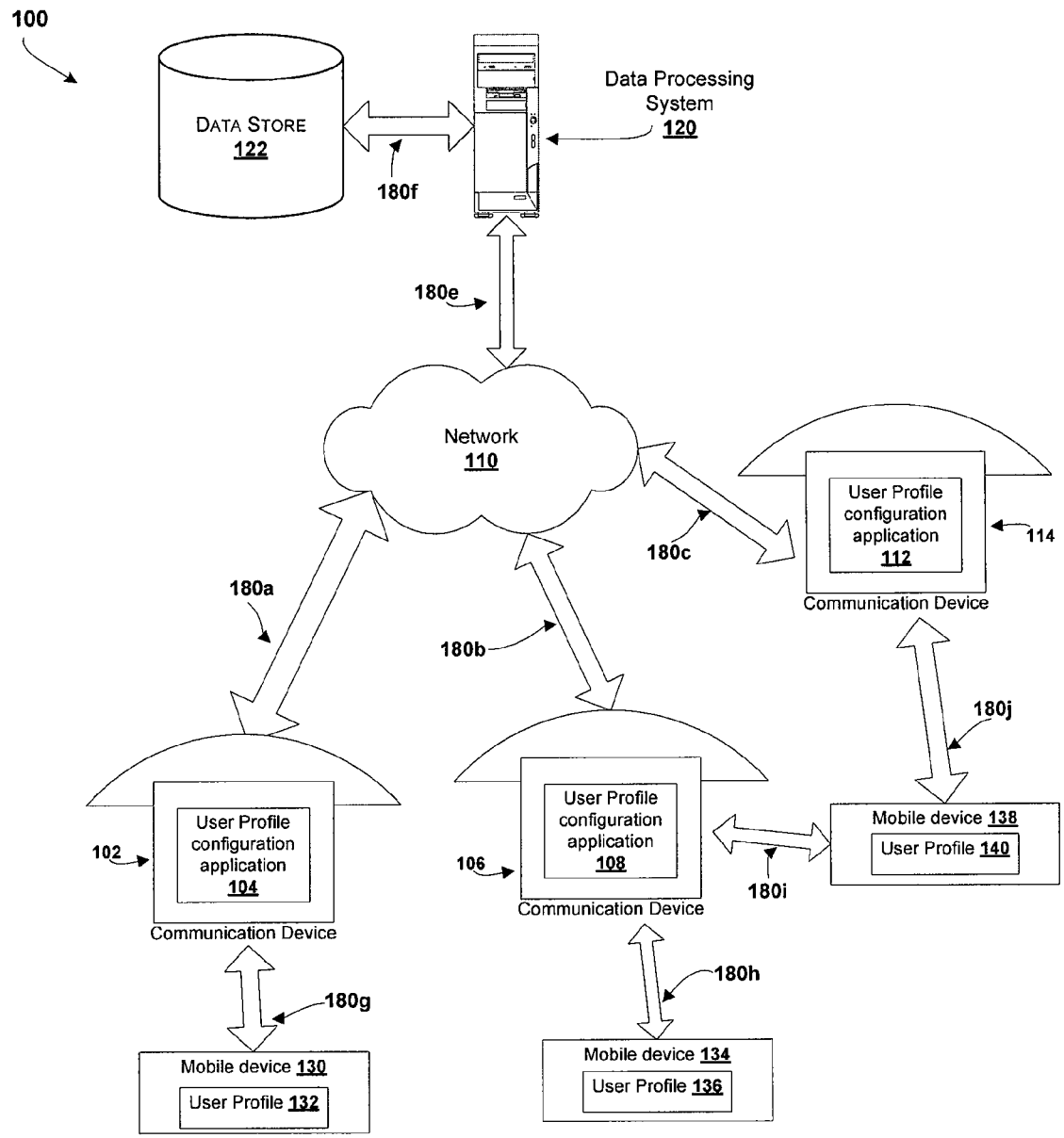
FIG. 1 depicts a environment in which the illustrative embodiments may be implemented.
Figure 2:
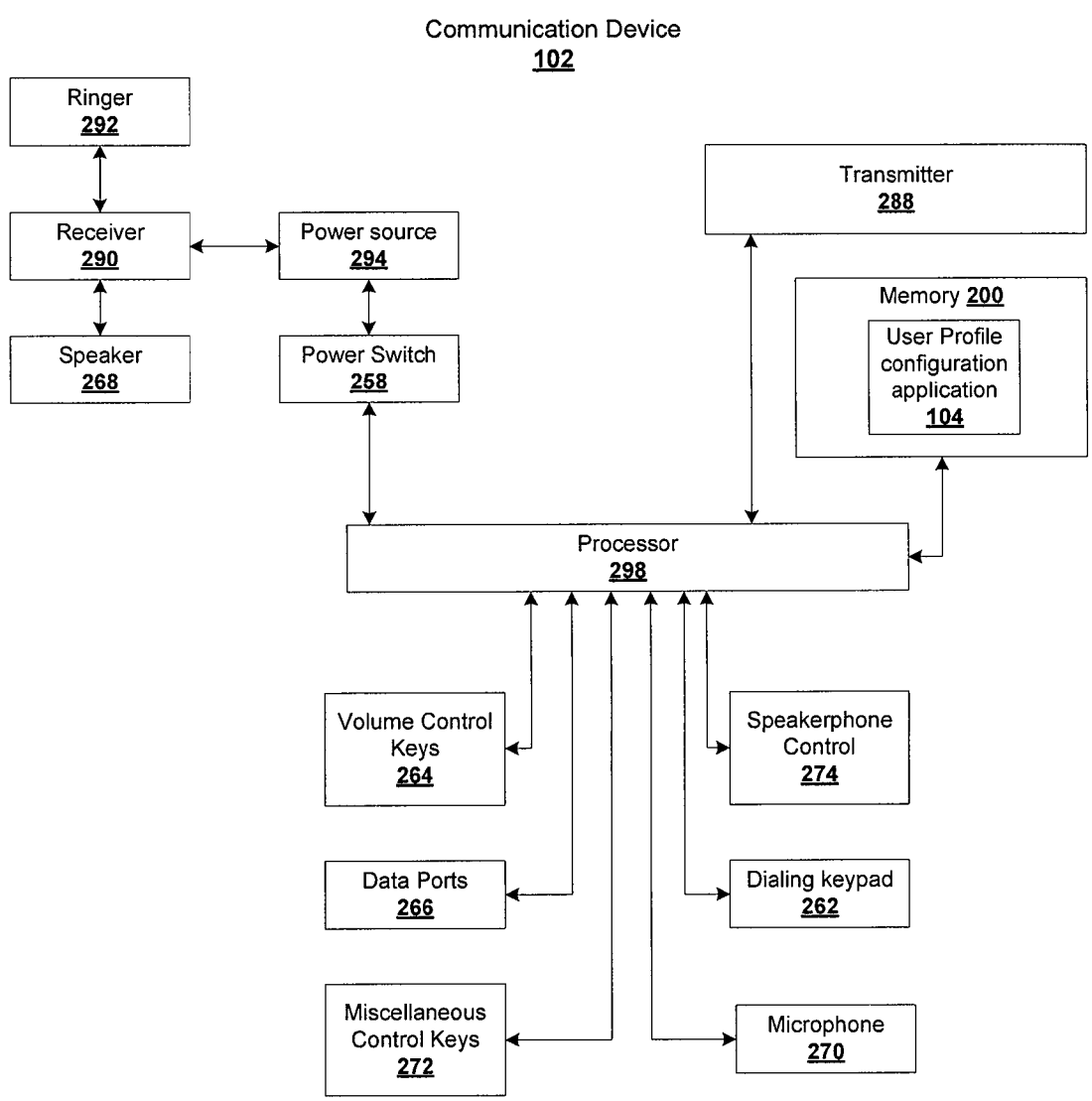
FIG. 2 is an embodiment of a communication device in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a network environment 100 in which the illustrative embodiments may be implemented. Network environment 100 includes network 110, which is the medium used to provide communications links between various devices and computers, such as, but not limited to, data processing system 120 and a plurality of communication devices, such as communication device 102, communication device 106, and communication device 114. Network 110 may include connections 180a-180f, such as, but is not limited to, wire, wireless communication links, or fiber optic cables to each of the devices.

Communication device 102, communication device 106, and communication device 114 may be any type of communication device including, but not limited to, a telephone connected by wired network, a cellular phone, and/or any other communication device capable of being configured to a specified user profile. In one embodiment, a user profile configuration application 104, user profile configuration application 108, and user profile configuration application 112 executes respectively on communication device 102, communication device 106, and communication device 114.

User profile configuration applications 104, 108, and 112 include computer executable instructions for detecting the presence of at least one mobile device storing a user profile, such as, but not limited to, mobile device 130, mobile device 134, and mobile device 138 respectively storing user profile 132, user profile 136, and user profile 140. A user profile, such as, but not limited to, user profile 132 is a data set that includes configuration settings and/or other personal data specific to a particular user, such as, but not limited to, the identity (of a preferred network carrier, a telephone number assigned to the user, speed call/contact information, class of service allowed, and/or other custom calling features.

In one embodiment, a mobile device 130 storing a user profile 132 may be capable of communicating data, such as, but not limited to, user profile 132, wirelessly to a communication device via communication links 180g-180j. For example, in one embodiment, mobile device 130 utilizes the Bluetooth™ protocol along with the Object Exchange (OBEX) communication protocol to facilitate data transmission over short distances between mobile device 130 and a communication device, such as, but not limited to, communication device 102. Alternatively, in some embodiments, other types of wireless protocols may be used including, but not limited to, Wireless Application Protocol (WAP) for transmitting data between the mobile device and a communication device.

In addition, in some embodiments, a mobile device storing a user profile may be physically connected to a data/communication port of the communication device to enable the communication device to access the user profile stored on the mobile device. For example, in some embodiments, mobile device 130 may be, but is not limited to, a Universal Serial Bus (USB) flash drive and/or a dongle. A dongle is a piece of hardware that attaches to a computing device in order to make a piece of secured software run and/or to authenticate a user.

As previously stated, communication device 102, communication device 106, and communication device 114 are connected via network 110. In one embodiment, network 110 is the Internet. The Internet is a global system of interconnected computer networks that interchange data using the standardized Internet Protocol Suite (TCP/IP). The Internet includes millions of private and public networks that are linked by copper wires, fiber-optic cables, wireless connections, and other technologies. Alternatively, in some embodiments, network 110 may also be implemented as a number of different types of networks, such as, but not limited to, an intranet, a local area network (LAN), or a wide area network (WAN).

The disclosed embodiments provide a system and method for configuring a communication device, such as, but not limited to, communication device 102. In one embodiment, the method includes monitoring for a presence of at least one mobile device that stores a user profile. In response to the communication device detecting the presence of at least one mobile device that stores a user profile, the method retrieves the user profile from the mobile device. The method configures the communication device in accordance with the user profile.

In addition, in some embodiments, the method records data associated with communications made while the communication device is configured with the user profile and transmits the data from the communication device to a remote data processing system, such as, but not limited to, data processing system 120. Further, in some embodiments, the method records data associated with changes made to the user profile while the communication device is configured with the user profile and updates the user profile on the mobile device with the updated data.

Data processing system 120 may include one or more computing device, such as, but not limited to, one or more servers and/or network computers. In addition, in some embodiments, data processing system 120 may communicate with one or data stores, such as, but not limited to, data store 122. Data store 122 may be a local data store associated with data processing system 120. Alternatively, in some embodiments, data store 122 may be stored on a remote computing device.

With reference now to FIG. 2, an embodiment of communication device 102 in which the illustrative embodiments may be implemented is presented. In this embodiment, communication device 102 includes a processor 298. Processor 298 is connected to an internal power source 294 via power switch 258. Processor 298 is also connected to receive control signals from dialing keypad 262, volume control keys 264, microphone 270, miscellaneous control keys 272 and speaker phone control 274. Speaker phone control key 274 transmits a signal to the processor 298 to activate or deactivate speaker 268 on communication device 102. Volume control keys 264 transmit a signal to increase or decrease the volume of the speaker 268 when the speaker 268 is activated by the speaker phone control key 274. Dialing keypad 262 is used for entering input into communication device 102, such as, but not limited to, telephone numbers and/or a user selection from a list of items. Communication device 102 also includes a receiver 290 connected to a speaker 268 and ringer 292 for receipt of audio signals and telephone ringing signals. In some embodiments, communication device 102 stores user input, data, and/or software applications, such as, but not limited to, user profile configuration application 104 in a memory 200. In one embodiment, communication device 102 includes a transmitter 288 for detecting a wireless signal of a mobile device, such as, but not limited to, mobile device 130. Additionally, in some embodiments, transmitter 288 may also be used to transfer data, such as, but not limited to, user profile 132 between communication device 102 and mobile device 130. Further, in some embodiments, communication device 102 may include data ports 266 for detecting and transferring data between communication device 102 and a mobile device connected to a data port of communication device 102 such as, but not limited to, a serial port, a parallel port, a universal serial bus (USB) port, and/or a memory card reader.

The different components illustrated for communication device 102 are not meant to provide architectural limitations to the manner in which different embodiments may be implemented. For example, the disclosed embodiments may be implemented in a communication device including components in addition to or in place of those illustrated for communication device 102.

Figure 3:
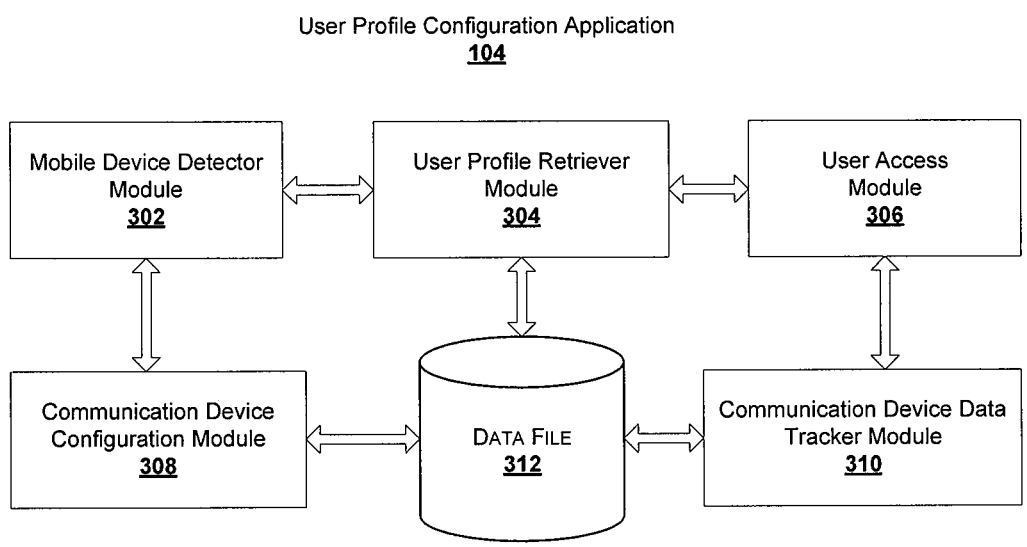
FIG. 3 is an embodiment of a user profile configuration application for configuring a communication device.

FIG. 3 is an embodiment of user profile configuration application 104 for configuring a communication device. In some embodiments, user profile configuration application 104 includes, among other modules, a mobile device detector module 302, user profile retriever module 304, user access module 306, communication device configuration module 308, and communication device data tracker module 310.

Mobile device detector module 302 comprises executable instruction code for detecting the presence of a mobile device. The mobile device, such as, but not limited to, mobile device 130 stores a user profile, such as, but not limited to, user profile 132. In some embodiments, mobile device detector module 302 detects the presence of mobile device 130 by detecting the presence of a wireless signal transmitted by mobile device 130. In addition, in some embodiments, mobile device detector module 302 may also detect the presence of mobile device 130 by detecting mobile device 130 connected to a data port of a communication device, such as, but not limited to, communication device 102.

User profile retriever module 304 retrieves a user profile stored on a detected mobile device. In some embodiments, user profile retriever module 304 may automatically retrieve the user profile upon detection of a mobile device and stores the user profile in data file 312. Alternatively, in some embodiments, user profile retriever module 304 retrieves a user profile of a detected mobile device after a user selection is received. For example, in some embodiments, communication device 102 may present a user interface that includes a list of detected mobile devices. A user may select from the list a desired user profile for configuring communication device 102. Further, in some embodiments, the data/user profile on the mobile device may be in an encrypted state to provide additional security. In these embodiments, user profile retriever module 304 may be used to decrypt the user profile after receiving the user profile from the mobile device.

In some embodiments, user profile configuration application 104 includes user access module 306 for verifying that a user associated with a selected user profile has access rights to a communication device prior to configuring the communication device in accordance with the user profile. For instance, in some embodiments, communication device 102 may be a secured communication device only accessible to users with a particular level of security clearance. Access rights, along with other data, may be stored locally by the communication device, such as, but not limited to, in data file 312. Alternatively, access rights for a particular communication device may be retrieved from an external data source, such as, but not limited to, data store 122. Further, in some embodiments, user access module 306 may maintain a data file, such as, but not limited to, data file 312. Data file 312 may include identifying information of a user along with a time stamp of when a mobile device was detected by the communication device. For example, data file 312 may be used to determine the identity of people who access restricted locations and/or private areas. Additionally, in some embodiments, user access module 306 may alter access rights associated with a particular user profile, such as, but not limited to, when a mobile device associated with the user profile is lost and/or stolen.

Communication device configuration module 308 executes instruction code for configuring a communication device, such as, but not limited to, communication device 102 with a selected user profile. In some embodiments, communication device configuration module 308 may configure a communication device on an as needed basis. For instance, in some embodiments, communication device configuration module 308 may configure communication device 102 with only essential features, such as, but not limited to, enabling a particular user associated with a user profile of a detected mobile device to access and/or use communication device 102. Communication device configuration module 308 may also configure an options menu for enabling a user to select particular features/functions associated with the user's profile. In response to receiving a particular selection, communication device configuration module 308 retrieves the information/data requested by the user from the mobile device and provides the information to the user. For example, in some embodiments, if the user selects a list of preset phone numbers option, communication device configuration module 308 retrieves the list from the mobile device and presents the list to the user. Thus, user profile configuration application 104 may enable a user quicker access to a communication device. Alternatively, in some embodiments, communication device configuration module 308 automatically retrieves the as needed data in the background after the user is granted access to the communication device and stores the data locally for quicker access when needed.

Figure 6:
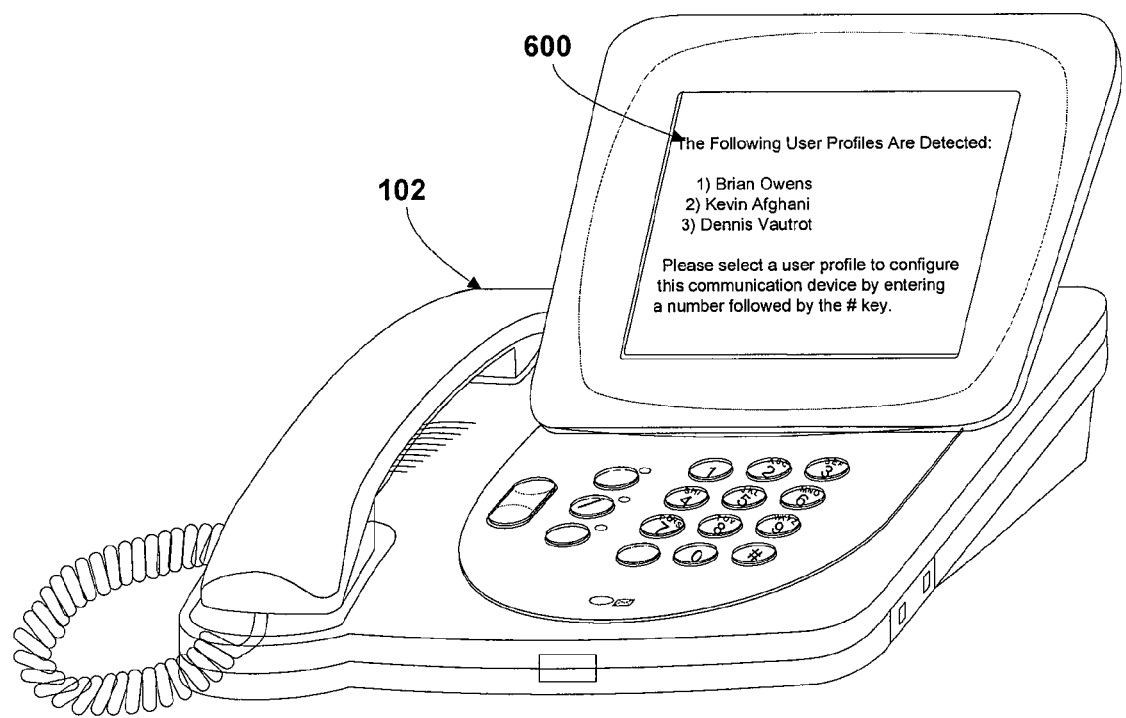
FIG. 6 is an illustration of a selection menu on a communication device.

Further, in some embodiments, if mobile device detector module 302 detects the presence of two or more mobile devices, communication device configuration module 308 may present a selection menu 600, as depicted in FIG. 6, for selecting a user profile between the two or more user profiles corresponding to the two or more detected mobile devices. In response to receiving the selected user profile, communication device configuration module 308 configures the communication device in accordance with the selected user profile.

Communication device data tracker module 310 records data associated with communications made while the communication device is configured with the user profile. For example, in some embodiments, communication device data tracker module 310 records the time, data, phone numbers, and length of calls made while configured with a particular user profile. In addition, in some embodiments, communication device data tracker module 310 maintains a data file that includes identifying information of users corresponding to user profiles stored on detected mobile devices. For example, in some embodiments, communication device data tracker module 310 records the identity of a user and the time period that the communication device detects a mobile device that is associated with the user's profile. For instance, the recorded data may be used to determine the identity of the people who were present for a teleconference and/or the amount time that they were present. Communication device data tracker module 310 may store the recorded data in a data file, such as, but not limited to, data file 312. Further, in some embodiments, communication device data tracker module 310 may transmit the data from the communication device to a remote data processing system, such as, but not limited to, data processing system 120.

Additionally, in other embodiments, communication device data tracker module 310 records any changes made to a user profile while configured on a communication device and transmits the changes to the mobile device to update the user profile stored on the mobile device. For example, if a user updates the phone number of a contact associated with a user profile stored on mobile device 130 while using communication device 102, communication device data tracker module 310 records the changes to the user profile and transmits data to mobile device 130 to update the user profile stored on mobile device 130.

Figure 4:
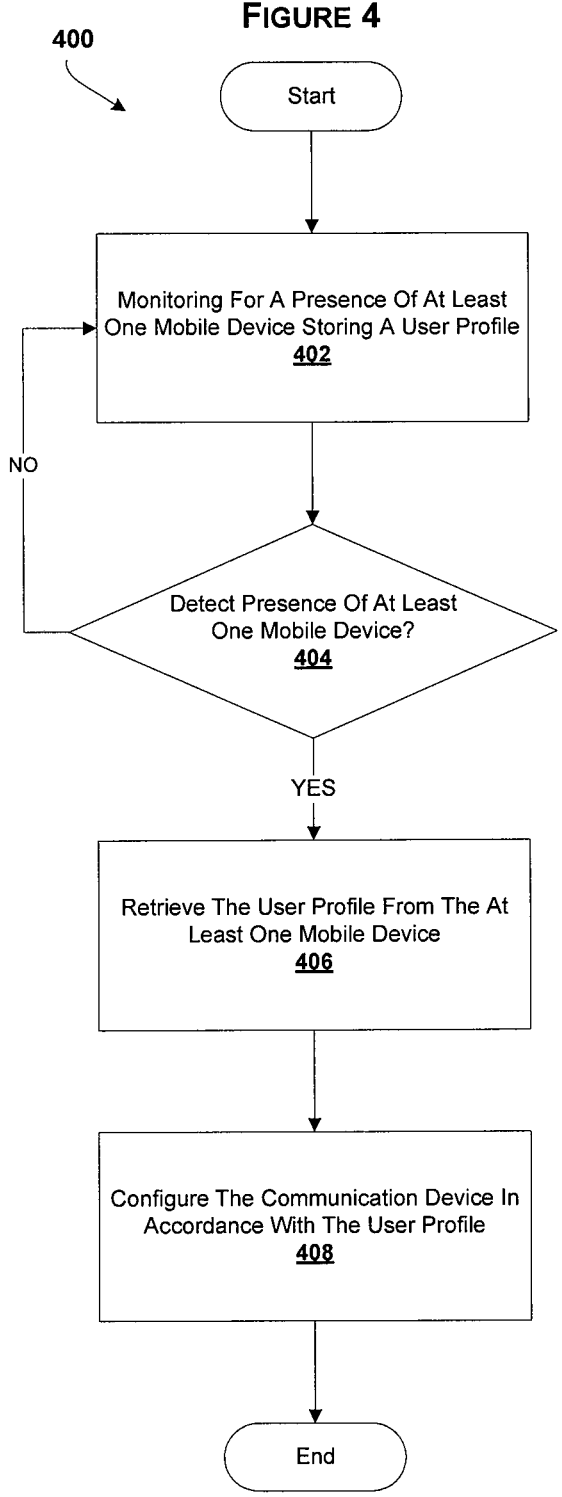
FIG. 4 is an embodiment of a process for configuring a communication device.

With reference now to FIG. 4, an embodiment of a process 400 for configuring a communication device is presented. Process 400 begins by monitoring for a presence of at least one mobile device storing a user profile at step 402. At step 404, the process determines whether the presence of at least one mobile device storing a user profile is detected. In response to detecting at least one mobile device storing a user profile, the process retrieves the user profile from the at least one mobile device at step 406. The process configures the communication device in accordance with the user profile at step 408, with process 400 terminating thereafter.

Figure 5:
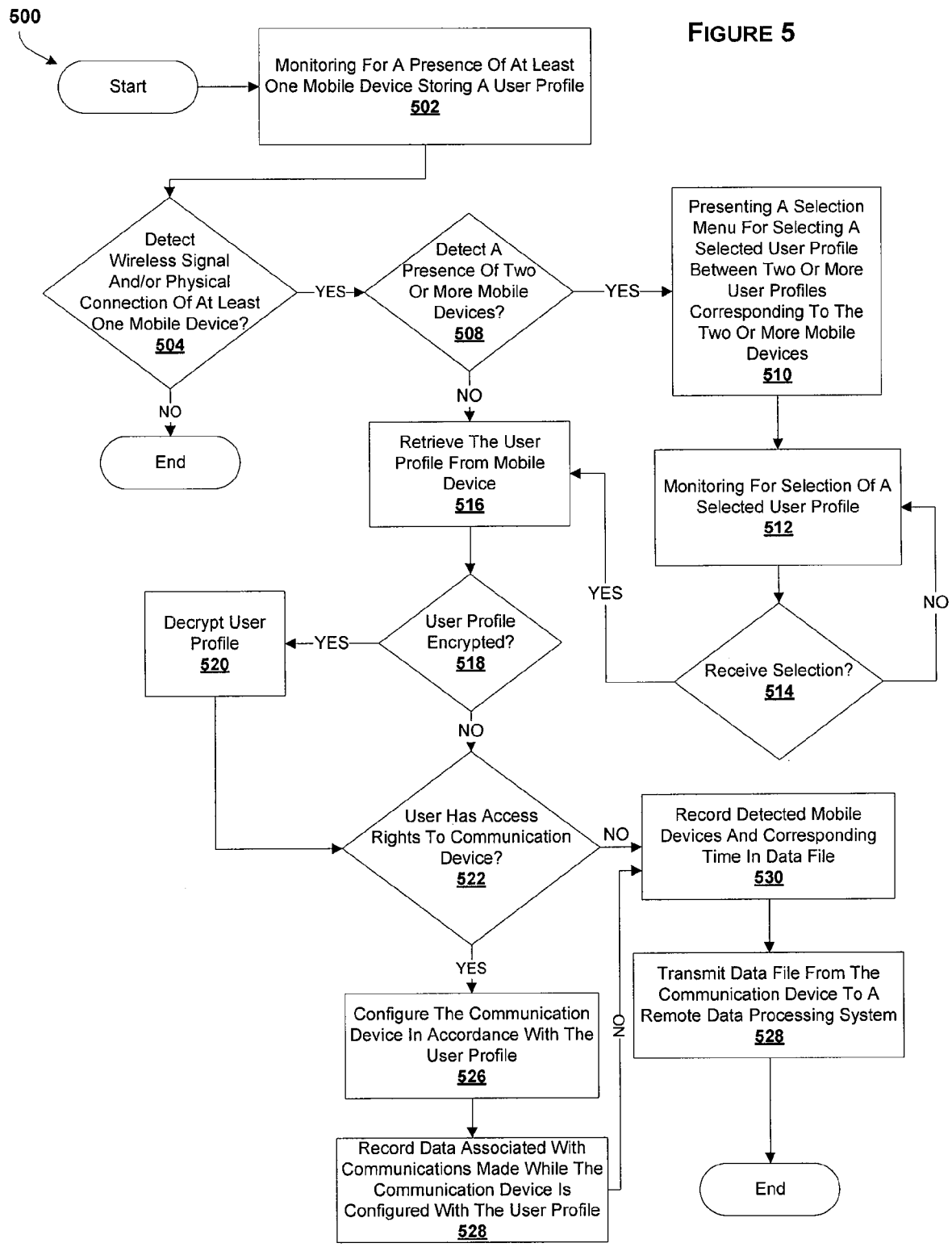
FIG. 5 is another embodiment of a process for configuring a communication device.

FIG. 5 is another embodiment of a process 500 for configuring a communication device. Process 500 begins by monitoring for a presence of at least one mobile device storing a user profile at step 502. At step 504, the process determines whether the presence of at least one mobile device storing a user profile is detected. In response to detecting at least one mobile device storing a user profile, the process determines whether the presence of two or more mobile devices is detected by the communication device at step 508. If the communication device detects the presence of two or more mobile devices, the process presents a selection menu for selecting a selected user profile between the two or more user profiles corresponding to the two or more detected mobile devices at step 510. The process monitors for a user-selection of a selected user profile from the selection menu at step 512. At step 514, the process determines whether a user-selection has been received. If a user-selection is received, the process retrieves the user profile from the selected mobile device at step 516.

Alternatively, if at step 508, the process does not detect the presence of two or more mobile devices, the process proceeds directly to step 516 and retrieves the user profile from the detected mobile device. At step 518, the process determines whether the retrieved user profile is encrypted. If the retrieved user profile is encrypted, the process, at step 520, decrypts the user profile. At step 522, the process determines whether a user associated with the retrieved user profile has access rights to use the particular communication device. If the user does not have access rights to the communication device, the process, at step 530, records identifying information such as, but not limited to, information identifying the detected mobile device(s) and corresponding time information.

However, if the user does have access tights to the communication device, the process configures the communication device in accordance with the user profile at step 526. In some embodiments, the process records data associated with communications made while the communication device is configured with the user profile at step 528. Additionally, in some embodiments, the process also records, in a data file, identifying information such as, but not limited to, information identifying the detected mobile device(s) and corresponding time information at step 530. Further, in some embodiments, the process transmits the data file from the communication device to a remote data processing system at step 528, with process 500 terminating thereafter.

Accordingly, the disclosed embodiments provide a system and method for configuring a communication device. In one embodiment, a method is presented that includes monitoring for a presence of at least one mobile device that stores a user profile. In response to the communication device detecting the presence of at least one mobile device that stores a user profile, the method retrieves the user profile from the mobile device. The method configures the communication device in accordance with the user profile.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method for configuring a wired telephone that includes a short range wireless communication transceiver, the method comprising:
    monitoring, by the wired telephone using the short range wireless communication transceiver, for a presence of at least one mobile device, the at least one mobile device storing a user profile that includes configuration information;
    responsive to the wired telephone detecting the presence of the at least one mobile device, retrieving the user profile from the at least one mobile device; and
    configuring the wired telephone in accordance with the user profile and the configuration information, wherein configuring the wired telephone includes assigning a telephone number that is part of the configuration information associated with the user profile that is passed from the at least one mobile device to the wired telephone, wherein the telephone number is used to call the wired telephone.

2. The method of claim 1, wherein detecting the presence of the at least one mobile device comprises detecting a wireless signal transmitted by the mobile device.

3. The method of claim 1, wherein detecting the presence of the at least one mobile device comprises detecting the mobile device connected to a data port of the wired telephone.

4. The method of claim 1, further comprising decrypting the user profile after receiving the user profile from the mobile device.

5. The method of claim 1, further comprising recording data associated with communications made while the wired telephone is configured with the user profile.

6. The method of claim 5, further comprising transmitting the data from the wired telephone to a remote data processing system.

7. The method of claim 1, further comprising:
recording updated data associated with changes made to the user profile while the wired telephone is configured with the user profile; and
updating the user profile on the at least one mobile device with the updated data.

8. The method of claim 1, further comprising verifying that a user associated with the user profile has access rights to the wired telephone prior to configuring the wired telephone in accordance with the user profile.

9. The method of claim 8, further comprising maintaining a data file that includes identifying information of the user along with a time stamp of when the at least one mobile device was detected by the wired telephone.

10. The method of claim 1, further comprising:
responsive to the wired telephone detecting a presence of two or more mobile devices, presenting a selection menu for selecting a selected user profile between two or more user profiles corresponding to the two or more mobile devices; and
responsive to receiving the selected user profile, configuring the wired telephone in accordance with the selected user profile.

11. The method of claim 10, further comprising:
maintaining a data file that includes identifying information of two or more users corresponding to the two or more user profiles and time information corresponding to a time period that the wired telephone detects the two or more mobile devices.

12. The method of claim 1, wherein configuring the telephone includes assigning speed dial contact information of the user to the telephone.

13. A telephone comprising:
a network interface for receiving a wired network connection;
a short range wireless communication transceiver;
memory coupled to a processing unit, the memory includes computer usable program code; and
the processing unit executes the computer usable program code to:
monitor using the short range wireless communication transceiver for a presence of at least one mobile device, the at least one mobile device storing a user profile that includes configuration information;
retrieve using the short range wireless communication transceiver the user profile from the at least one mobile device; and
configure the telephone in accordance with the user profile and the configuration information, wherein configuring the telephone includes assigning a telephone number that is part of the configuration information associated with the user profile that is passed from the at least one mobile device to the telephone, wherein the telephone number is used to call the telephone.

14. The telephone of claim 13, wherein the processing unit executes the computer usable program code to decrypt the user profile after receiving the user profile from the mobile device.

15. The telephone of claim 13, wherein the processing unit executes the computer usable program code to record data associated with communications made while the telephone is configured with the user profile.

16. The telephone of claim 15, wherein the processing unit executes the computer usable program code to transmit the data from the telephone to a remote data processing system.

17. The telephone of claim 13, wherein the processing unit executes the computer usable program code to:
record updated data associated with changes made to the user profile while the telephone is configured with the user profile; and
update the user profile on the at least one mobile device with the updated data.

18. The telephone of claim 13, wherein the processing unit executes the computer usable program code to verify that a user associated with the user profile has access rights to the telephone prior to configuring the telephone in accordance with the user profile.

19. The telephone of claim 13, wherein the processing unit executes the computer usable program code to maintain a data file that includes identifying information of the user along with a time stamp of when the at least one mobile device was detected by the telephone.

20. The telephone of claim 13, wherein the processing unit executes the computer usable program code to present a selection menu for selecting a user profile from among two or more user profiles corresponding to two or more detected mobile devices.

21. The telephone of claim 13, wherein the processing unit executes the computer usable program code to maintain a data file that includes identifying information including time information of all detected mobile devices.

22. The telephone of claim 13, wherein the configuration assigns speed dial contact information of the user to the telephone.

* * * * *